(12) United States Patent
Spaulding

(10) Patent No.: US 9,363,260 B2
(45) Date of Patent: Jun. 7, 2016

(54) DETECTING SHARING OF PASSWORDS FOR PASSWORD PROTECTED USER ACCOUNTS

(71) Applicant: Oracle International Corporation, Redwood Shores, CA (US)

(72) Inventor: Kent Spaulding, Portland, OR (US)

(73) Assignee: Oracle International Corporation, Redwood Shores, CA (US)

( * ) Notice: Subject to any disclaimer, the term of this patent is extended or adjusted under 35 U.S.C. 154(b) by 14 days.

(21) Appl. No.: 14/325,011

(22) Filed: Jul. 7, 2014

(65) Prior Publication Data

US 2016/0006720 A1    Jan. 7, 2016

(51) Int. Cl.
*H04L 29/06* (2006.01)
*G06F 21/36* (2013.01)

(52) U.S. Cl.
CPC ............ *H04L 63/0838* (2013.01); *G06F 21/36* (2013.01)

(58) Field of Classification Search
CPC .. H04L 63/0815; H04L 63/0838; G06F 21/36
USPC .......................................................... 726/8
See application file for complete search history.

(56) References Cited

U.S. PATENT DOCUMENTS

| | | | |
|---|---|---|---|
| 6,442,692 B1 | 8/2002 | Zilberman | |
| 7,886,345 B2 | 2/2011 | Kaliski et al. | |
| 8,516,606 B2 | 8/2013 | Dorfman | |
| 8,566,472 B2 | 10/2013 | Piccionelli | |
| 8,583,574 B2 | 11/2013 | Rodriguez | |
| 8,613,097 B2 | 12/2013 | Lord | |
| 2001/0054155 A1* | 12/2001 | Hagan | G06F 21/6254 713/193 |
| 2006/0280339 A1 | 12/2006 | Cho | |
| 2008/0028231 A1* | 1/2008 | Bender | G06F 21/316 713/186 |
| 2008/0028232 A1* | 1/2008 | Bender | G06F 21/316 713/186 |
| 2008/0034218 A1* | 2/2008 | Bender | G06F 21/316 713/186 |
| 2008/0133933 A1* | 6/2008 | Bender | G06F 21/316 713/186 |
| 2008/0222002 A1* | 9/2008 | Hu | G06Q 20/382 705/38 |
| 2011/0112931 A1* | 5/2011 | Hu | G06Q 20/382 705/26.35 |
| 2011/0213969 A1* | 9/2011 | Nakhjiri | H04L 63/061 713/158 |

(Continued)

FOREIGN PATENT DOCUMENTS

GB    WO 2007128975 A2 * 11/2007 ............ G06F 21/316

OTHER PUBLICATIONS

Monrose et al. "Password Hardening Based on Keystroke Dynamics," Proceedings of the 6th ACM conference on Computer and communications security(CCS '99) pp. 73-82 (Nov. 1999).

(Continued)

*Primary Examiner* — Michael S McNally
(74) *Attorney, Agent, or Firm* — Kilpatrick Townsend and Stockton LLP

(57) ABSTRACT

A method for detecting the sharing of a password related to a password protected user account provided by an organization, by multiple entities of the organization is disclosed. In one embodiment, input associated with a training word is received from a user of a user computing device. In some examples, the input may include a sequence of user input entries related to the training word. In some embodiments, metadata associated with the sequence of user input entries is derived and a user input pattern profile is generated based on the metadata. In some embodiments, an authorized user of the organization is identified based at least in part on comparing the received input to the user input pattern profile.

17 Claims, 9 Drawing Sheets

(56) References Cited

U.S. PATENT DOCUMENTS

| | | |
|---|---|---|
| 2013/0086666 A1 | 4/2013 | Cheng et al. |
| 2013/0343616 A1 | 12/2013 | Forero et al. |
| 2014/0317028 A1* | 10/2014 | Turgeman ............ H04W 12/06 706/11 |
| 2014/0317726 A1* | 10/2014 | Turgeman ............ H04W 12/06 726/19 |
| 2014/0317744 A1* | 10/2014 | Turgeman ........... H04L 63/1408 726/23 |
| 2014/0325223 A1* | 10/2014 | Turgeman ........... H04L 63/1408 713/168 |
| 2014/0325645 A1* | 10/2014 | Turgeman ........... H04L 63/1408 726/22 |
| 2014/0325646 A1* | 10/2014 | Turgeman ............ G06F 21/316 726/22 |
| 2014/0325682 A1* | 10/2014 | Turgeman ............ H04L 63/126 726/29 |
| 2014/0344927 A1* | 11/2014 | Turgeman ............ H04W 12/06 726/22 |

OTHER PUBLICATIONS

Patrick "Monitoring Corporate Password Sharing Using Social Network Analysis," paper to be presented at the International Sunbelt Social Network Conference, St. Pete Beach, Florida, Jan. 22-27, 2008.

"One-Time Passwords—roadmap," downloaded from http://hea-www.harvard.edu/~fine/Tech/otp.html on Apr. 8, 2014.

* cited by examiner

DETECTING SHARING OF PASSWORDS FOR PASSWORD PROTECTED USER ACCOUNTS

BACKGROUND OF THE INVENTION

Organizations generally utilize multiple password protected user accounts for providing secure access to computing resources within the organization. These resources may include, for example, software products, applications (e.g., cloud-based applications, enterprise applications, or any other applications), cloud services, various types of data (e.g., networked files, directory information, databases, or the like) and other resources. In order to effectively keep track of resource access by users within an organization, an organization may often use a generic password protected user account with a single password that may be shared among a set of users of the organization. However, sharing passwords may pose several challenges.

Multi-factor authentication has been traditionally used as an authentication mechanism to protect access to user accounts on computing systems. In addition to a username and password to gain access to various resources of the organization, during multi-factor authentication, users may present additional evidence of their identity via one or more other factors. These additional factors may include for example, an authentication token from a token generating device, a scan of a fingerprint, or a one-time code sent to the user's email account or via SMS. However, adding an additional factor to a password-based authentication is inconvenient for users as they need extra devices (token generator, biometric scanner, email account, mobile phone and the like) and time to receive and enter the code. While various techniques have been employed to effectively share such codes or tokens with only intended parties, the employed techniques are of varied success.

BRIEF SUMMARY OF THE INVENTION

Techniques described herein include a method and system for detecting the sharing of a password related to a password protected user account provided by an organization, by multiple entities of the organization. In one embodiment, a challenge word and/or a training word is provided to users of an organization that enables the organization to detect if a password protected user account is being shared across multiple users of the organization. In certain embodiments, techniques are provided (e.g., a method, a system, non-transitory computer-readable medium storing code or instructions executable by one or more processors) for providing account management services to users of an organization. In one embodiment, an account management system is disclosed that provides the ability for multiple entities of the organization to provide account management services to users of the organization.

In some aspects, the organization may be part of a distributed system, described herein. In some examples, the distributed system may comprise a network of subsidiary and/or affiliate systems (e.g., kiosks, franchise stores, corporations and the like) that may be managed, hosted and/or controlled by the organization. The network of affiliate systems, may, in turn be managed by one or more entities (e.g., users, account administrators, support users) of the organization using one or more computing devices such as a mobile phone, a smart phone, a personal digital assistant (PDA), a laptop computer, a desktop computer, a kiosk, a thin-client device, a tablet PC and the like.

In accordance with some embodiments, one or more entities (e.g., account administrators) of the organization may utilize a generic account provided by the account management system to access one or more account management services. These services may include, for example, provisioning accounts to users of the organization. In one embodiment, a method is disclosed to determine inappropriate access to the generic account by the one or more entities of the organization by identifying the number of entities sharing the generic account.

In accordance with at least one embodiment, a user (e.g., an account administrator) on a computing device (e.g., a kiosk computer) may access an application (e.g., an account provisioning application) provided by the account management system to login to a generic account. In some examples, the user may be requested to input a training word during login. In some examples, the training word may include a string of characters (e.g., a combination of letters and numbers) of a predetermined character length that is provided to the user. In certain embodiments, the training word may be a randomly selected word from a subset of training words that may not be publically available to the users. Thus, in some examples, the training word may provide an additional layer of security for a user accessing a password protected generic account provided by the organization.

In some examples, the account management system may be configured to receive login information including input associated with the training word from the user to determine whether the login information identifies the user based at least in part on the received input.

In accordance with one set of operations, the account management system may be configured to provide a training word to a user of a user computing device and receive input associated with the training word from the user. In some examples, the input may comprise a sequence of user input entries related to the training word. In another set of operations, the account management system may be configured to derive metadata associated with the sequence of user input entries and generate a user input pattern profile based at least in part on the metadata. In some operations, the account management system may be configured to receive login information from the user computing device and determine whether the login information identifies the user based at least in part on the user input pattern profile.

In accordance with another set of operations, the account management system may be configured to receive an input comprising a sequence of user input entries related to a first training word from a user computing device, receive login information from the user computing device, compare the received input to one or more user input pattern profiles and determine which of a first user or a second user of a plurality of users provided the received input, based at least in part on the comparison of the received input to the one or more user input pattern profiles.

In accordance with yet another set of operations, the account management system may be configured to generate a plurality of computer-generated entries of an image of a word, receive login information from a user computing device, compare input associated with the login information to the plurality of computer-generated entries and a plurality of user input pattern profiles. In some embodiments, the account management system may then determine that the login information identifies a user of the user computing device, based on comparing the input associated with the login information with the computer-generated entries and the user input pattern profiles.

DETAILED DESCRIPTION OF THE INVENTION

The techniques described above and below may be implemented in a number of ways and in a number of contexts. Several example implementations and contexts are provided with reference to the following figures, as described below in more detail. However, the following implementations and contexts are but a few of many.

Figure 1:
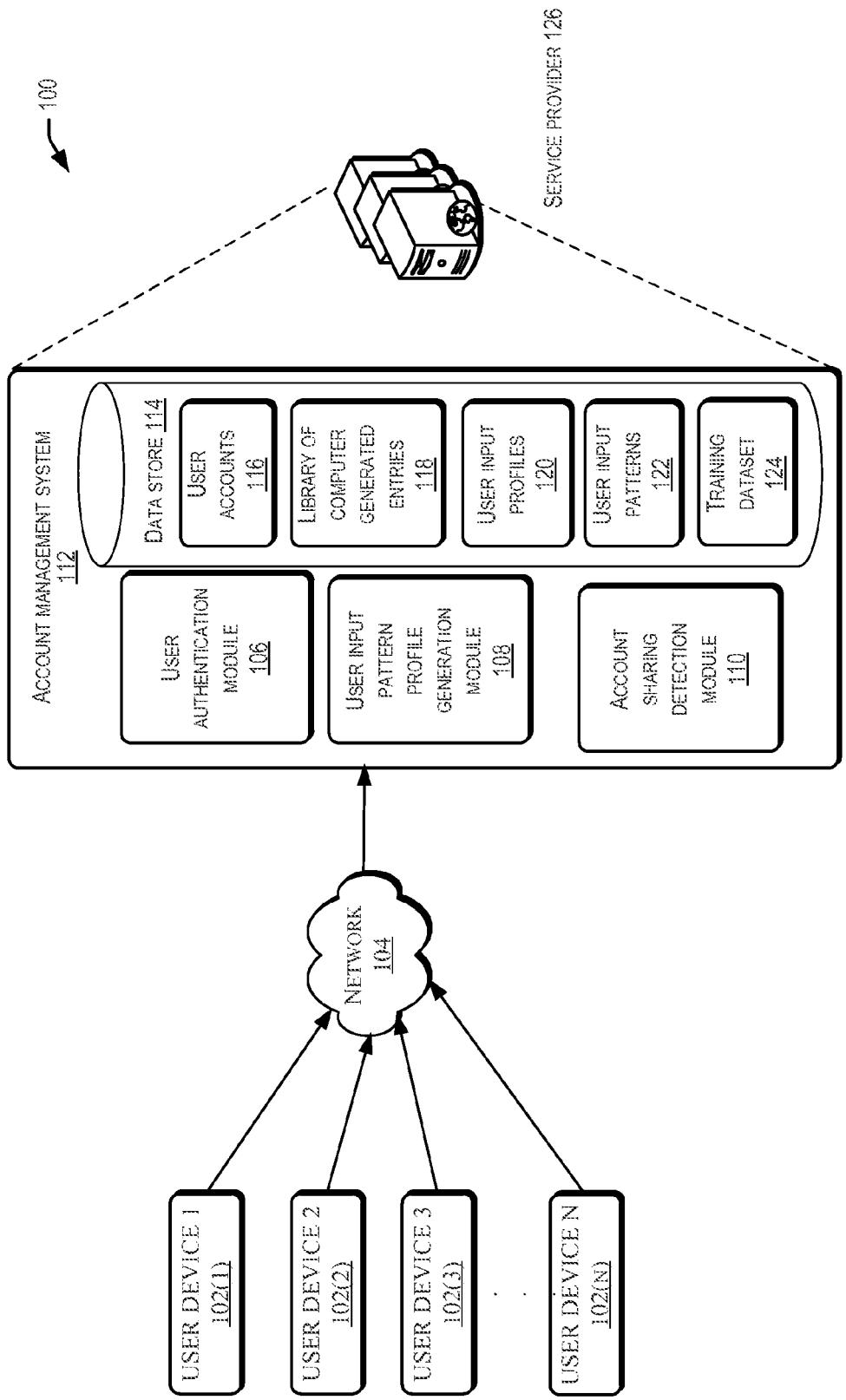
FIG. 1 depicts aspects of an example system architecture in accordance with at least one embodiment of the present disclosure.

FIG. 1 depicts aspects of an example system architecture 100 in accordance with at least one embodiment of the present disclosure. The architecture 100 includes an account management system 112 communicatively connected to one or more user computing devices 102(1) . . . 102(n) (collectively, user devices 102) via a network 104. In some examples, the network 104 may include any one or a combination of many different types of networks, such as cable networks, the Internet, wireless networks, cellular networks and other private and/or public networks.

In one embodiment, the account management system 112 may be managed, hosted and/or provided by one or more service provider computers 96, described herein. In certain embodiments, the service provider computers 96 may be configured to provide account management services (e.g., the creation and/or provisioning of user accounts) to the users (e.g., an account administrator) of the user devices 102, via the account management system 112.

In some aspects, the user devices 102 may be part of a distributed system managed by, controlled by, or otherwise part of the service provider computers 96. For example, the user devices 102 may be managed, hosted or provided by a network of affiliate systems (e.g., kiosks, franchise stores, corporations and the like) managed by the service provider 126. In some aspects, one or more users of the user devices 102 may be configured to operate a client application such as a web browser, a proprietary client application or some other application to access services provided by the account management system 112. These services may include, for example, the management and/or provisioning of resources (e.g., subscriber phone accounts) to subscribers of the service provider 126.

In some examples, the service provider computers 126 may also provide computing resources such as, but not limited to, data storage, data access, management, virtualization, cloud-based software solutions, electronic content performance management, and the like. The service provider computers may be operable to provide web hosting, computer application development, and/or implementation platforms, combinations of the foregoing, or the like to the users.

In some aspects, the service provider computers 126 may be any type of computing devices such as, but not limited to, a mobile phone, a smart phone, a kiosk, a personal digital assistant (PDA), a laptop computer, a desktop computer, a server computer, a thin-client device, a tablet PC, etc. Additionally, it should be noted that in accordance with at least one embodiment, the service provider computers may be executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the service provider computers 96 may be in communication with the user devices 102 and/or other service providers via the networks 104, or via other network connections. The service provider computers may include one or more servers, perhaps arranged in a cluster, as a server farm, or as individual servers not associated with the account management system 19 described herein as part of an integrated, distributed computing environment.

The user devices 102 may be any type of computing device such as, but not limited to, a mobile phone, a smart phone, a personal digital assistant (PDA), a laptop computer, a desktop computer, a kiosk, a thin-client device, a tablet PC, an electronic book (e-book) reader, etc. In some examples, the user devices 102 may be in communication with the service provider computers 96 via the networks 104, or via other network connections.

In accordance with at least one embodiment, the account management system 112 may include a user authentication module 106, a user input pattern profile generation module 108, an account sharing detection module 110 and a data store 114 accessible to the user authentication module 106, the user input pattern profile generation module 108 and the account sharing detection module 110. The data store 114 may be configured to provide a storage repository for storing information related to the management of log-in credentials by entities accessing services provided by the account management system 19. In some examples, the data store 114 may include a user accounts database 116, a library of computer-generated entries of training words 118, a user input profiles database 120, a user input patterns database 122 and a training dataset 124. The modules (106, 108 and 110) of the account management system 112 may be implemented in software (e.g., program code, instructions executable by a processor), in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.). Additional details of the operations performed by the various modules (e.g., 106, 108 and 110) are discussed in detail below.

In accordance with at least one embodiment, the user input pattern profile generation module 108 may be configured to provide a training word to a user of a user device 102 when the user registers with and/or logs into a generic account provided by the account management system 112, from the user device 102. In some examples, the training word may include a string of characters (e.g., a combination of letters and numbers) of a predetermined character length that is provided to the user. In other examples, the training word may also include an image of a string of a predetermined character length. For example, the image of a string may include a Completely Automated Public Turing test to tell Computers and Humans Apart (CAPTCHA) image of an alphanumeric string that may be presented to the user when the user logs into the generic account. In some examples, the CAPTCHA image may include an image of a training word or an image chosen by a user to associate with a training word stored in the training dataset 124. In some embodiments, the user input pattern generation module 108 may be configured to randomly select a training word from a subset of training words stored in the training dataset 128. Thus, a user may be provided with the same training word, in some examples, or a different training word from the subset of training words, in other examples each time a user registers with and/or logs into the generic account.

In accordance with at least some embodiments, the user input pattern profile generation module 108 may be configured to receive input associated with the training word from the user. In some examples, the input may correspond to a sequence of user input entries related to the training word. In some examples, the input may be received via input devices such as a keyboard, keypad, mouse, trackball, a touchpad and/or a touch screen incorporated into a display of the user device 102. In other embodiments, the input may also be received via input devices such as voice command recognition systems, microphones and motion sensing and/or gesture recognition devices that receive user input using gestures and spoken commands. In some examples, the input may also be received via eye gesture recognition devices that detect eye activity (e.g., 'blinking') from a user.

In some examples, the sequence of user input entries may represent a series of actions performed by the user in relation to the training word. The actions may include, for example, a press or a release of a particular key, a press or a release of a pointing device such as a mouse or touch pad, and/or a press or release of a finger by the user as the user inputs the training word into the input device. The actions may also include the user saying the training word via a voice input, the user blinking to input the training word or the user making a gesture (e.g., waving hands) to input the training word.

In some embodiments, the sequence of user input entries may be represented as a time-series of events, wherein each event may correspond to an action performed by the user. In some examples, the user input pattern generation module 108 may be configured to store the input (i.e., a sequence of user input entries) corresponding to the training word in a user input patterns database 122.

In accordance with at least some embodiments, the user input pattern profile generation module 108 may be configured to generate a user input pattern profile based at least in part on the sequence of user input entries. In some examples, the user input pattern profile may be stored in the user input profiles database 120. The manner in which the user input pattern profile generation module 116 may generate a user input pattern profile is discussed in relation to FIG. 2.

In accordance with some examples, the user input pattern profile generation module 108 may also be configured to receive input associated with the login information from the user in addition to the input associated with the training word. For example, the received input may include a sequence of user input entries corresponding to the username and password entered by the user. In some examples, the user input pattern profile generation module 108 may be configured to store input related to the login information in the user input patterns database 122. Thus, in some examples, the user input pattern profile may also be generated based at least in part on the input related to the login information stored in the user input patterns database 122.

In accordance with at least one embodiment, the account sharing detection module 110 may be configured to compare the input received from the user to one or more user input pattern profiles stored in the user input profiles database 120. Based at least in part on the comparing, in some examples, the account sharing detection module 110 may be configured to determine if the user accessing the generic account is an authorized user of the account management system 112. In some embodiments, the account sharing detection module 110 may be configured to identify the number of users who have shared access to the generic account based at least in part on the number of identified user input pattern profiles. The identification of users based on the generated user input pattern profiles is discussed in detail in relation to FIG. 2.

In accordance with at least some embodiments, the account management system 112 may also be configured to obtain a plurality of computer-generated entries of a subset of training words. In some examples, the plurality of computer-generated entries may correspond to computer-generated entries of images of a string. In some examples, the entries may be generated by one or more modules of the account management system 112 by simulating typing rhythms of access credentials typed by users when users register and/or log into applications and/or resources provided by the account management system 122.

In accordance with some embodiments, the account sharing detection module 118 may be configured to compare the received input from the user device 102 to the user input pattern profile profiles stored in the user input profiles database 120 and the computer-generated entries of a subset of training words stored in the library of computer generated entries 118. In some examples, based at least in part on the comparing, the account sharing detection module 118 may then be configured to determine if the received input corresponds to a registered user of the account management system 112 or a computer-generated entry of a training word not associated with a user of the account management system 112. For example, based on the comparing, the account management system 112 may determine that the received input is generated from an automated program and/or application, such as a bot attempting to gain unauthorized access into the account management system 112.

In accordance with at least some embodiments, the user authentication module 106 may be configured to either grant access or deny access to a user of the account management system 112 based at least in part on the input received from the account sharing detection module 110. For example, if the account sharing detection module 110 determines that the user is an authorized user of the system, the user authentication module 106 may grant access to the user by comparing the login credentials of the user stored in the user accounts database 116 to the login information input by the user. If the account sharing detection module 110 determines that the user is not an authorized user of the system, the user authentication module 106 may either request the user to re-enter the login credentials or deny the user access into the system. In some embodiments, the user authentication module 106 may log all attempts to authenticate a user into the system, including information related to the received input from the user such as a sequence of user input entries related to one or more training words input by the user. In some examples, this information may be utilized by the user authentication module 106 to detect information related to the sharing of passwords and/or for auditing purposes. Additionally, in some examples, the user accounts database 116 may store information that authenticates the identities of users of the account management system 112 and information that describes which actions those users are authorized to perform relative to various system resources (e.g., files, directories, applications, communication ports, memory segments, etc.)

In some embodiments, once the user is authenticated, the user authentication module 106 may send a notification to the user indicating that the requested service is now available for use. In some instance, information (e.g. a link) may be sent to the user that enables the user to start using the requested services.

Figure 2:
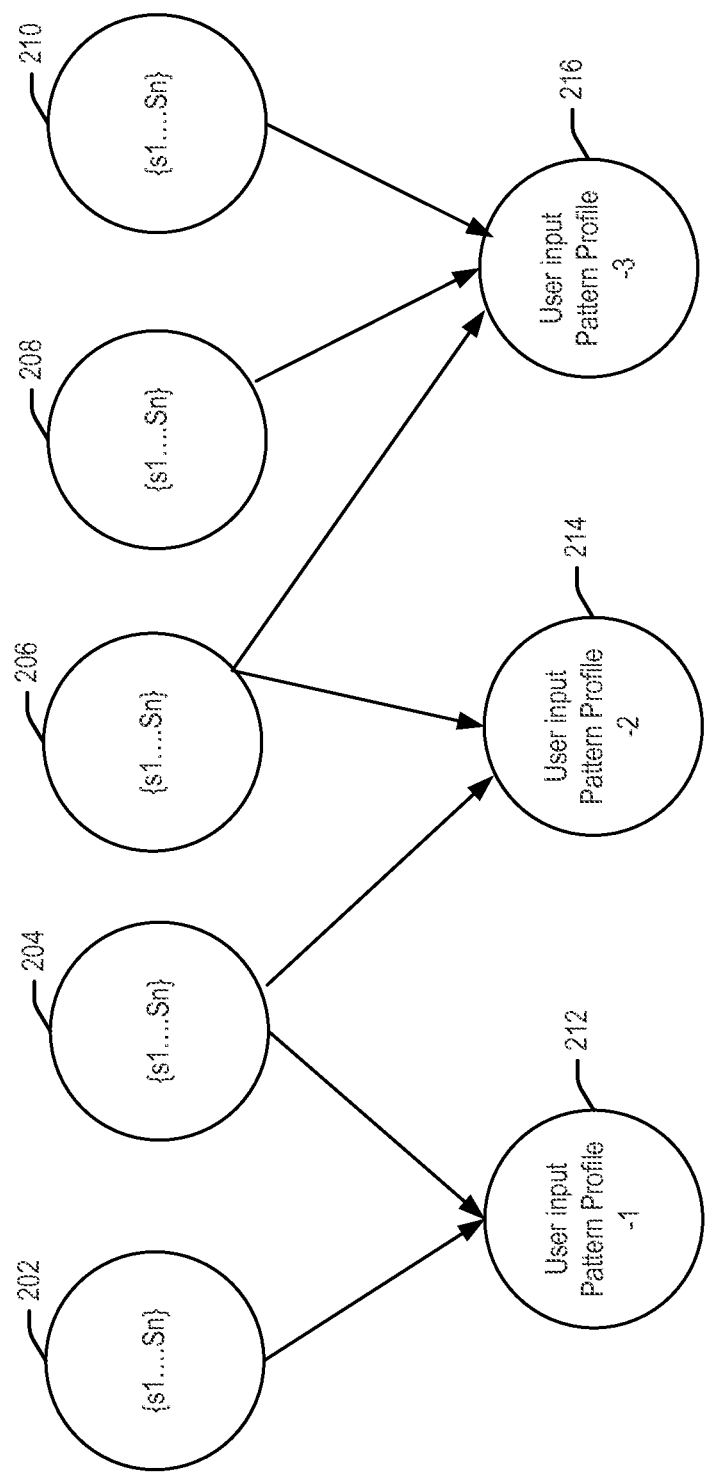
FIG. 2 is an exemplary illustration of the generation of user input pattern profiles, in accordance with one embodiment of the present disclosure.

FIG. 2 is an exemplary illustration of the generation of user input pattern profiles, in accordance with one embodiment of the present disclosure. In one embodiment, the user input pattern profiles may be generated by the user input pattern profile generation module 108 discussed in relation to FIG. 1. In certain embodiments, the user input pattern profile module 108 may be configured to analyze one or more data sets (e.g., 202, 204, 206, 208 and 210) stored in the user input patterns database 122. In some examples, the one or more data sets 202, 204, 206, 208 and 210 may include a set of samples corresponding to a sequence of user input entries related to a training word input by one or more users of the user devices 102. Additionally, in some examples, each sample in the one or more data sets (e.g., 202, 2041, 206, 208 and 210) may relate to a training word that may be input by the same user or a different user of the user devices 102

In accordance with at least some embodiments, the user input pattern profile generation module 108 may be configured to generate the one or more user input pattern profiles based at least in part on deriving metadata related to sequence of user input entries corresponding to each sample of the data sets 202, 204, 206, 208 and 210. In one example, the metadata may include user input timing information related to a sequence of user input entries corresponding to a sample of a data set. In some examples, user input timing information may include, for example, the dwell time of a key 'x', the flight time of a key 'x' or the latency of a key 'x' of a user typing a training word. As described herein, the dwell time of a key 'x' may measure the time interval from the time at which the key 'x' was pressed to the time at which the key 'x' was released. The flight time may measure the time interval at which a key 'x' was released to the time at which a next key was pressed. The latency may measure the time interval from the time at which a key 'x' was pressed to the time the next key was pressed. In other examples, the user input timing information may include, measuring the dwell time, the flight time and/or the latency of the press and/or the release of the user's finger on a touch screen or touchpad utilized by the user to type the training word and/or the press and/or release of an input device such as a mouse or a trackball utilized by the user to type the training word.

In an example, a sequence of user input entries corresponding to the typing of a training word ('W' 'O' 'R' 'D') by a user may be represented as a time-series of events as follows: {timeFromDisplayToTyping, dt("w"), ft("o"), dt("o"), ft("r"), dt("r"), ft("d"), dt("d"), ft(advance), dt(advance)} wherein 'dt(x)' corresponds to the dwell time of a key 'x', 'ft(x)' corresponds to the flight time of a key 'x' and advance corresponds to a tab key (to go to the next field) or a submit key pressed by a user.

In some examples, the user input pattern profile generation module 108 may be configured to measure the similarity between a pair of samples in the data sets 202, 204, 206, 208 and 210, based at least in part on the user input timing information. In some examples, the similarity between a pair of samples of a data set may be measured based on various metrics. For example, the similarity may be determined by computing the distance between the pair of samples. The distance may be computed, for example, by measuring the Euclidian distance between the pair of samples. Other distance metrics may be used by the user input pattern profile generation module 108, in other examples. In some examples, the similarity between a pair of samples may also be determined by computing the total dwell time and the total flight time of each of the samples.

The user input pattern profile generation module 116 may then be configured to partition the data sets 202, 204, 206, 208 and 210 based at least in part on the determined similarity. For instance, the user input pattern profile generation module 108 may combine one or more samples of the data sets into a single cluster if the distance between a pair of samples in a data set or between data sets is determined to be within a pre-determined threshold value. Or, for example, one or more samples of the data sets may be combined into a single cluster if the total dwell time and the total flight time of the samples are within a pre-determined threshold value. In one embodiment, the resulting clusters may be referred to herein as user input pattern profiles. In one embodiment, the number of user input pattern profiles determined may relate to the number of users sharing access to the generic account. In the example illustrated in FIG. 2, three user input pattern profile clusters (e.g., 212, 214 and 216) are generated, indicative of three users sharing access to the generic account.

In some embodiments, the account sharing detection module 110 (shown in FIG. 1) may determine the number of users who have shared access to the generic account based at least in part on the number of identified user input pattern profiles. In other embodiments, the account sharing detection module 110 may determine that a user is an unauthorized user of the account management system 112 based at least in part on comparing the received input to one or more user input pattern profiles. For instance, if the received input does not match any one of the generated user input pattern profiles, it may be determined that the user is an unauthorized user of the account management system 112. In other embodiments, the account sharing detection module 110 may compare the received input to one or more stored user input pattern profiles in the user input profiles database 120 and the library of computer generated entries 118 to determine if a user or an automated software program is attempting to gain unauthorized access into the system.

Figure 3:
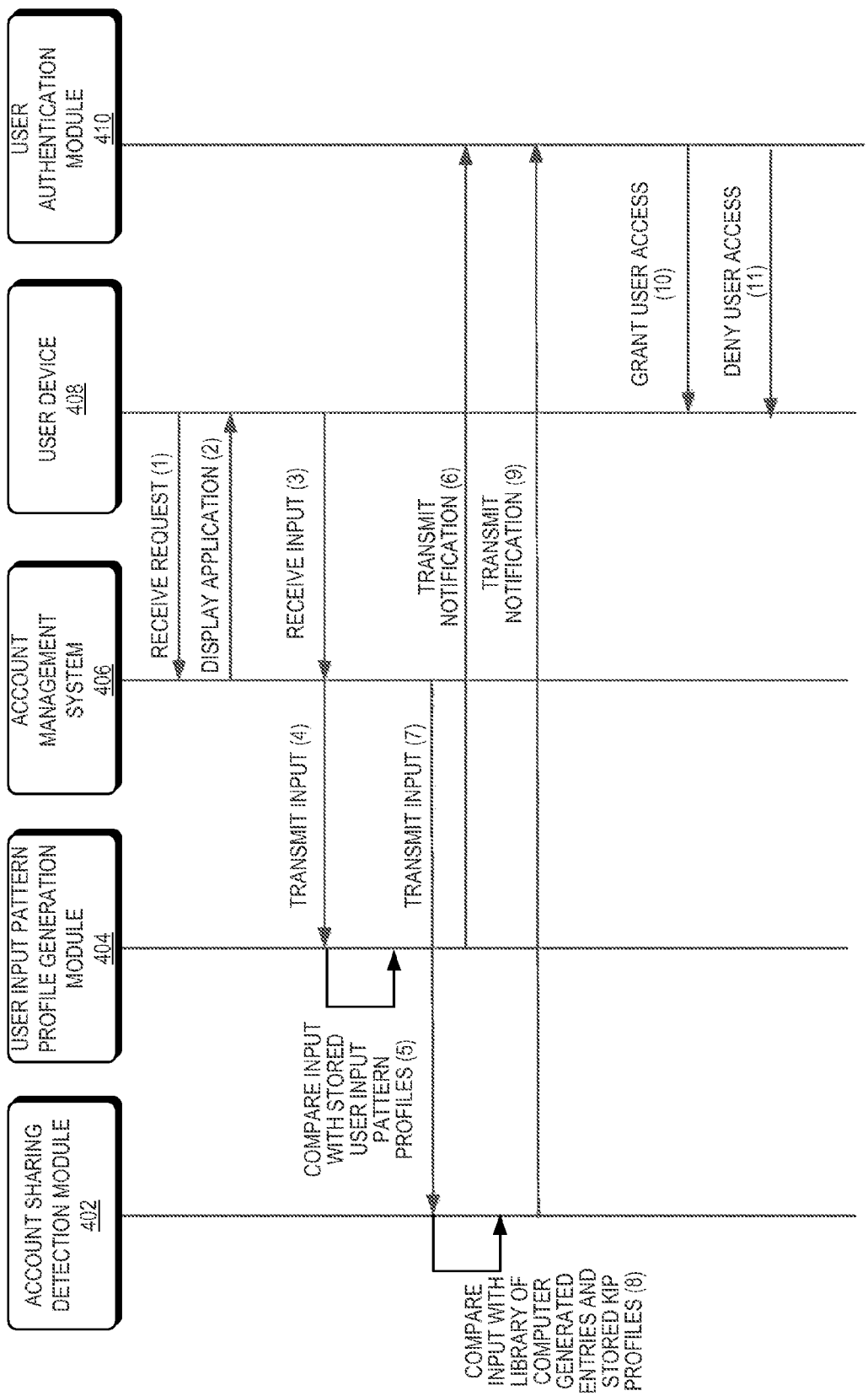
FIG. 3 depicts an example sequence diagram of the steps performed by one or more modules of the account management system depicted in FIG. 1, in accordance with one embodiment of the present disclosure.

FIG. 3 depicts an example sequence diagram of the steps performed by one or more modules of the account management system depicted in FIG. 1, in accordance with one embodiment of the present disclosure. The sequence diagram depicted in FIG. 3 is only an example of the operations performed by the account management system and is not intended to be limiting. In one example, an exemplary sequence of operations performed by the account management system may be as follows:

At (1) the account management system 406 may receive a request from a user device 408 to access an application (e.g., an account provisioning application) provided by the account management system 406.

At (2) the account management system 406 may display the application to the user via a user interface of the user device 408.

At (3) the account management system 406 may receive input related to the training word from the user. Additionally, in some examples, the account management system 406 may also receive input related to the login information input by the user when the user registers with and/or accesses the application via the user device 408.

At (4) the account management system 406 may transmit the received input to the user input pattern profiles generation module 404. The input, in some examples, may include a sequence of user input entries related to the training word and/or the login information input by the user.

At (5), the user input pattern profiles generation module 404 may compare the received input to one or more user input pattern profiles stored in the user input profiles database 120.

At (6), the user input pattern profiles generation module 404 may transmit a notification to the user authentication module 410, based at least in part on the comparing. In some examples, the notification is a message provided to the user authentication module 410 that indicates whether the user is an identified user or an unidentified user of the account management system 406.

At (7), substantially simultaneously, the account management system 406 may also transmit the received input from the user device 408 to the account sharing detection module 402.

At (8), the account sharing detection module 402 may compare the received input with the stored user input pattern profiles and a plurality of computer-generated entries of a subset of training words stored in the library of computer generated entries 118.

At (9), the account sharing detection module 402 may transmit a notification to the user authentication module 410, based at least in part on the comparing. In some examples, the notification is a message provided to the user authentication module 410 that indicates whether the user is an identified user or an automated software program attempting to gain access into the account management system 406.

At (10), if the user is determined to be an identified user, the user authentication module 410 grants the user access to the application. In some examples, the user authentication module 410 may also send a notification to the user device 408 indicating that the requested service is now available for use by the user.

At (11), if the user is determined to be an unauthorized user or an automated software program attempting to gain access into the account management system 406, the user authentication module 410 may deny access to the user and/or prevent the user device from gaining access to the application. In some examples, the user authentication module 410 may also send a notification to the user device 408 indicating that the requested service has been denied to the user and/or may send a notification to the user to request the user to re-enter the login information.

In some embodiments, at (11) a user may be provided with one or more additional training words from the training dataset (e.g., 124). The additional training words may be the same as the original training word, in some examples, or a different training word, in other examples. In some examples, if the input associated with the additional training word matches one or more user input pattern profiles stored in the user input profiles database 120, the user authentication module 410 may authorize the user into the system. In other examples, the user authentication module 410 may lock the user out of the account for a pre-specified period of time, if no match between the received input and the user input pattern profiles are found.

Figure 4:
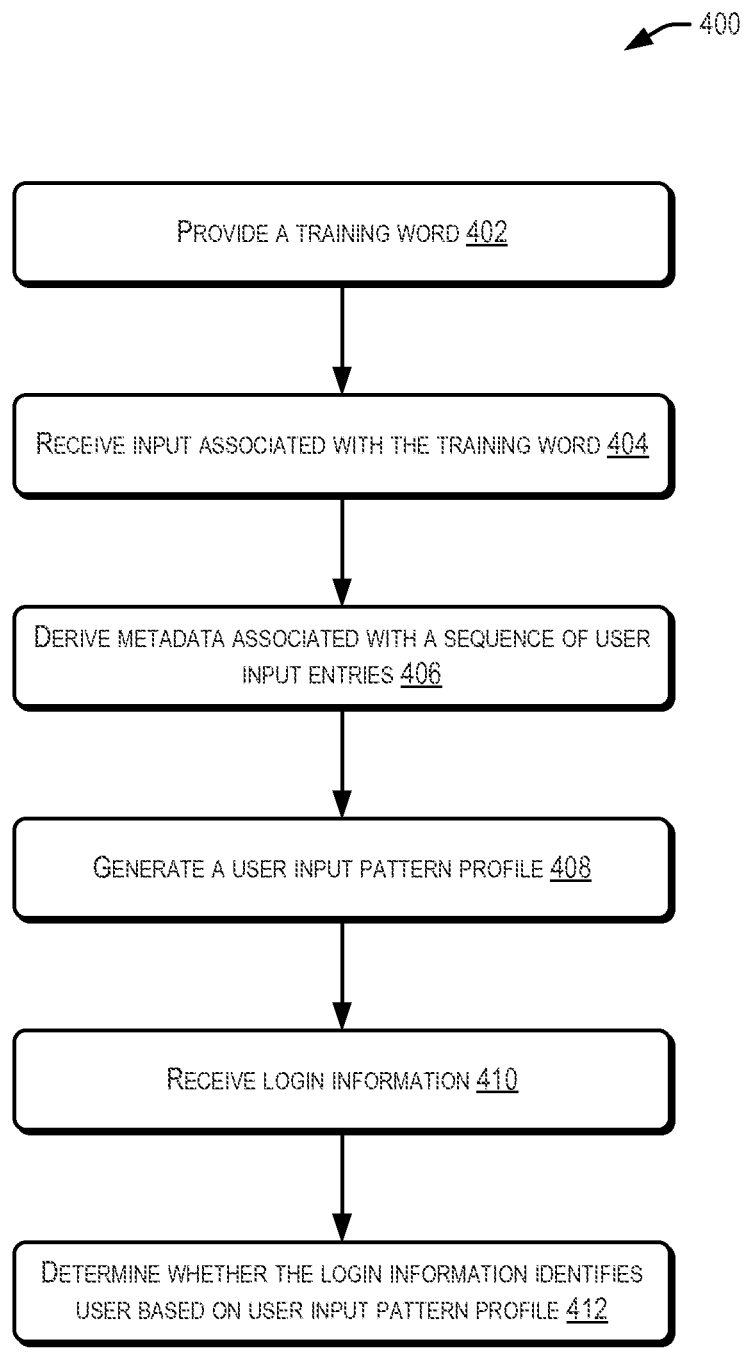
FIG. 4 illustrates a flow diagram of an example process 400 for providing account management services offered by the account management system, described herein.

FIG. 4 illustrates an example flow diagram showing respective processes 400, 500 and 600 of providing account management services for users of the account management system, described herein. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. The computer-readable storage medium may be non-transitory. In some examples, the account management system 112 (e.g., utilizing at least the user authentication module 106, the user input pattern profiles generation module 108 and the account sharing detection module 110) shown in at least FIG. 1 (and others) may perform the processes 400, 500 and 600 of FIG. 4, FIG. 5 and FIG. 6 respectively.

FIG. 4 illustrates a flow diagram of an example process 400 for providing account management services offered by the account management system, described herein. The process at 400 may begin at 402 by providing a training word to a user of a user computing device (e.g., 102). At 404, the process at 400 may include receiving input associated with the training word from the user. In some examples, the input may include a sequence of user input entries related to the training word. At 406, the process at 400 may include deriving metadata associated with the sequence of user input entries. Metadata associated with the sequence of user input entries may include, for example, user input timing information such as the dwell time, flight time or latency related to the sequence of user input entries. At 408, the process at 400 may include generating a user input pattern profile based at least in part on the received input. In some examples, at 410, the process 400 may include receiving login information from the user computing device. In some examples, the login information may include input related to a training word entered by the user. In some embodiments, at 412, the process 400 may include determining whether the login information identifies the user based at least in part on the user input pattern profiles.

Figure 5:
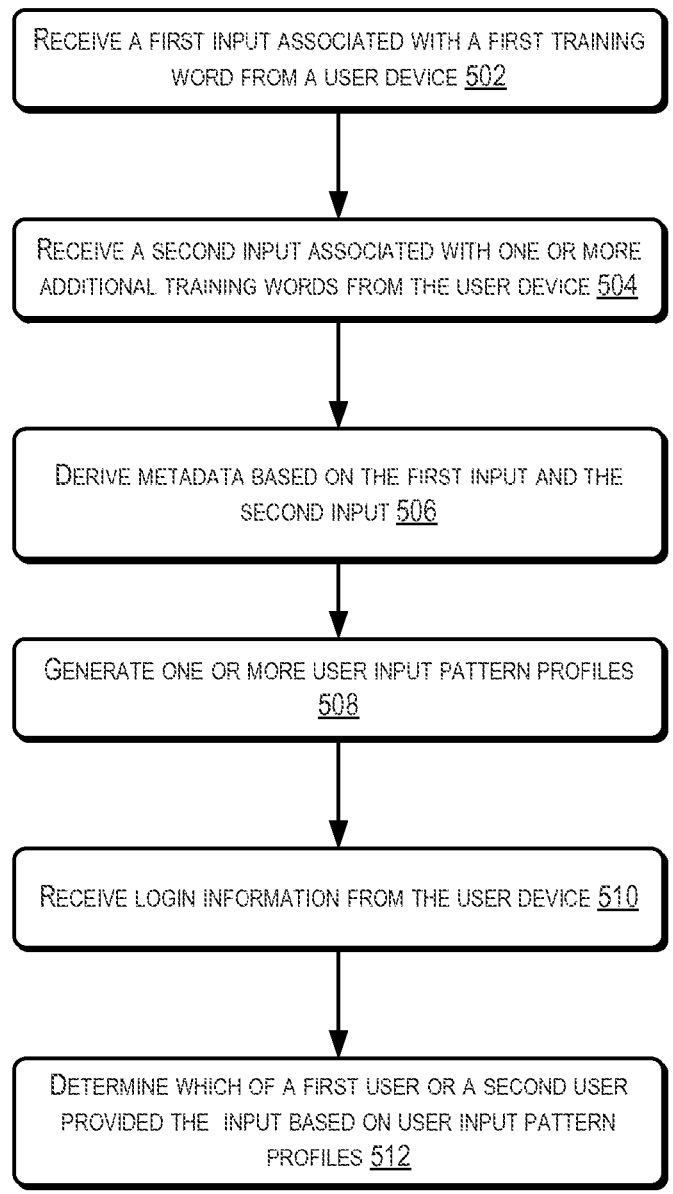
FIG. 5 illustrates a flow diagram of an example process 500 for providing account management services offered by the account management system, described herein.

FIG. 5 illustrates a flow diagram of an example process 500 for providing account management services offered by the account management system, described herein. The process at 500 may begin at 502 by receiving a first input associated with a first training word from a subset of training words from a user computing device (e.g., 102). In some examples, at 504, the process 500 may include receiving a second input associated with one or more additional training words from the user computing device. In some embodiments, the first input and the second input may comprise a sequence of user input entries corresponding to the first training word and the additional training words respectively. At 506, the process 500 may include deriving metadata based at least in part on the first input and the second input. At 508, the process 500 may include generating one or more user input pattern profiles based at least in part on the first input and the second input. At 510, the process 500 may include receiving login information from the user device. At 512, the process 500 may include determining which of a first user or a second user of a plurality of users of the account management system provided the first input or the second input, based at least in part on the comparison of at least one of the first input or the second input to the one or more user input pattern profiles.

Figure 6:
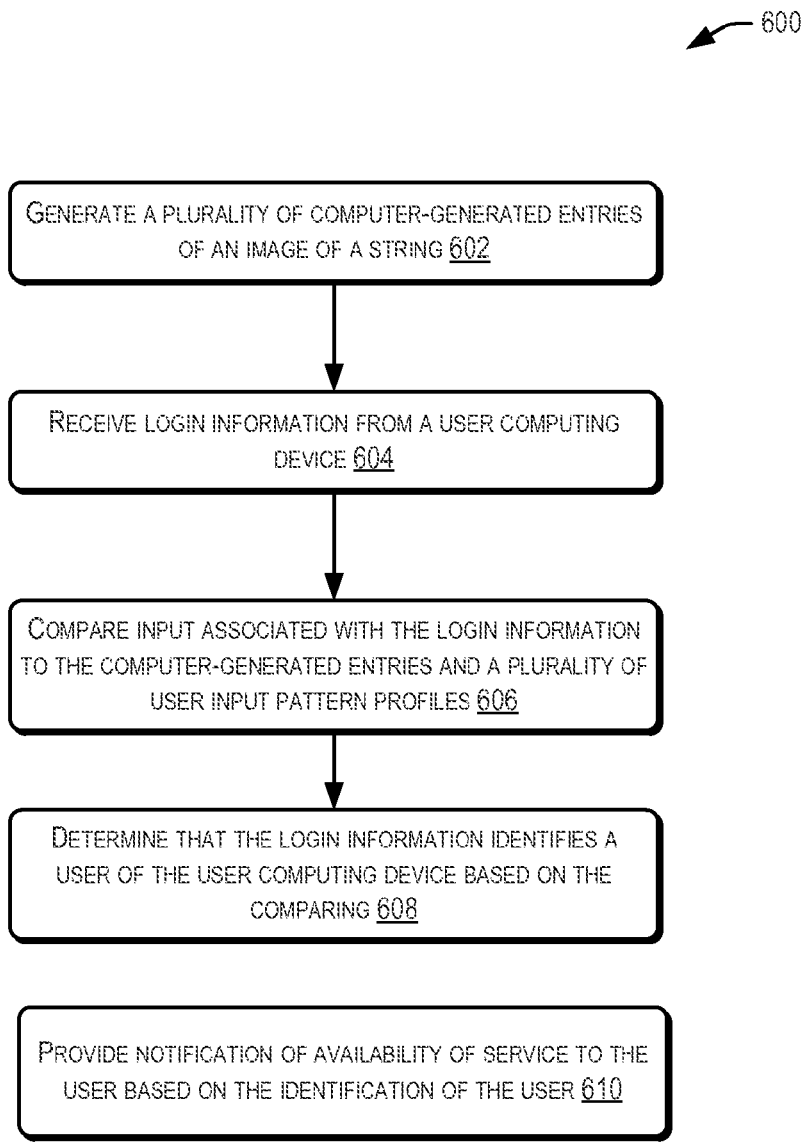
FIG. 6 illustrates a flow diagram of an example process 600 for providing account management services offered by the account management system, described herein.

FIG. 6 illustrates a flow diagram of an example process 600 for providing account management services offered by the account management system, described herein. The process at 600 may begin at 602 by generating a plurality of computer-generated entries of an image of a string. At 604, the process at 600 may include receiving login information from a user computing device. At 606, the process at 600 may include comparing input associated with the login information to the plurality of computer-generated entries and a plurality of user input pattern profiles. In some examples, at 608, the process at 600 may include determining that the login information identifies a user of the user computing device, based at least in part on the comparing. In some examples, at 610, the process at 600 may include providing a notification to the user computing device indicating availability of a service requested by the user of the user computing device, based at least in part on determining that the login information identifies the user.

Figure 7:
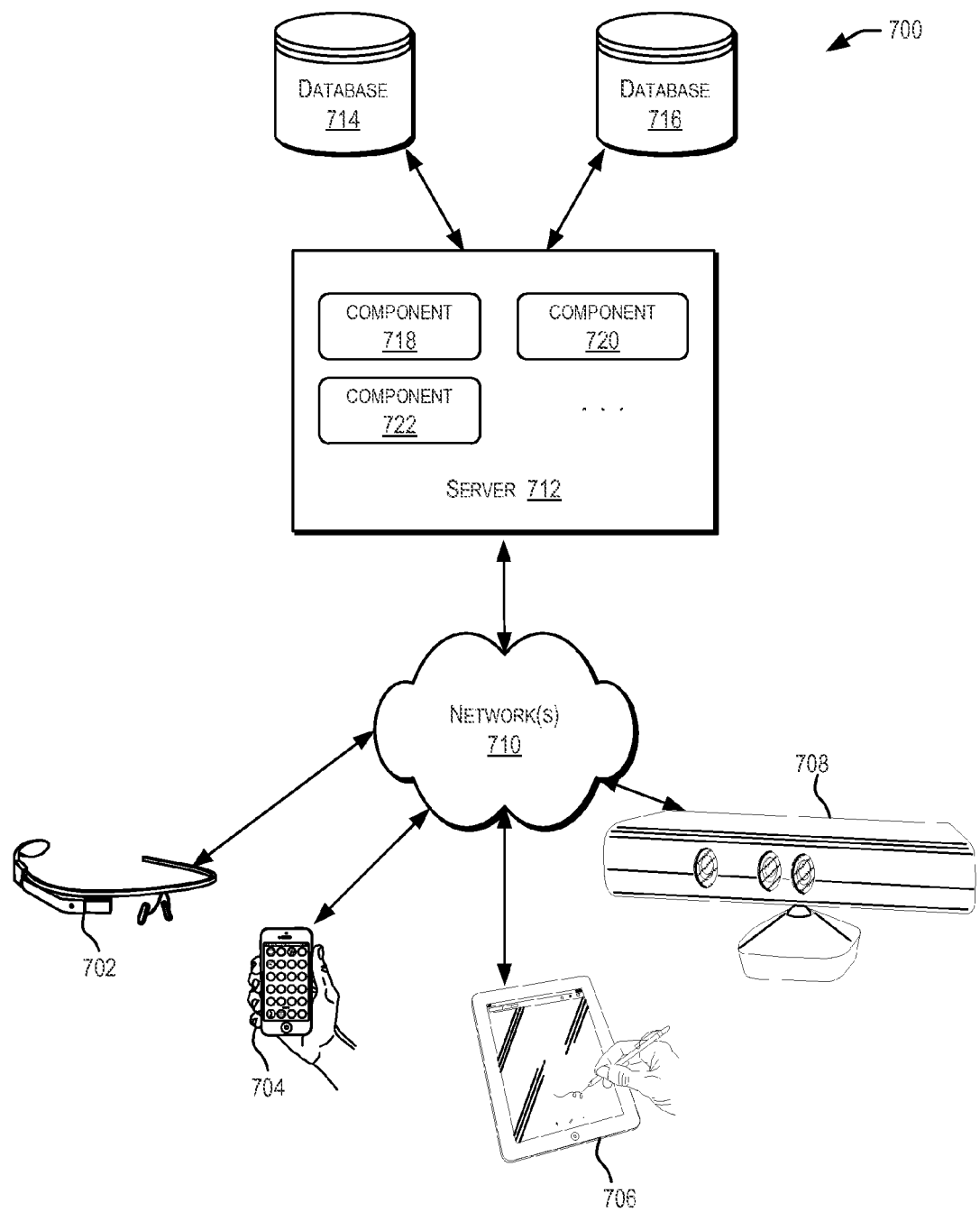
FIG. 7 depicts a simplified diagram of a distributed system for implementing an embodiment.

FIG. 7 depicts a simplified diagram of a distributed system 700 for implementing an embodiment. In the illustrated embodiment, the distributed system 700 includes one or more client computing devices 702, 704, 706, and 708, which are configured to execute and operate a client application such as a web browser, proprietary client (e.g., Oracle Forms), or the like over one or more network(s) 710. The server 712 may be communicatively coupled with the remote client computing devices 702, 704, 706, and 708 via network 710.

In various embodiments, the server 712 may be adapted to run one or more services or software applications such as services and applications that provide account management services. In certain embodiments, the server 712 may also provide other services or software applications can include non-virtual and virtual environments. In some embodiments, these services may be offered as web-based or cloud services or under a Software as a Service (SaaS) model to the users of the client computing devices 702, 704, 76, and/or 708. Users operating the client computing devices 702, 704, 706, and/or 708 may in turn utilize one or more client applications to interact with the server 712 to utilize the services provided by these components.

In the configuration depicted in FIG. 7, the software components 718, 720 and 722 of system 700 are shown as being implemented on the server 712. In other embodiments, one or more of the components of the system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in FIG. 10 is thus one example of a distributed system for implementing an embodiment system and is not intended to be limiting.

The client computing devices 702, 704, 706, and/or 708 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 710.

Although distributed system 700 in FIG. 7 is shown with four client computing devices, any number of client computing devices may be supported. Other devices, such as devices with sensors, etc., may interact with the server 712.

The network(s) 710 in the distributed system 700 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 710 can be a local area network (LAN), networks based on Ethernet, Token-Ring, a wide-area network, the Internet, a virtual network, a virtual private network (VPN), an intranet, an extranret, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 712 can include one or more virtual machines running virtual operating systems, or other computing architectures involving virtualization. One or more flexible pools of logical storage devices can be virtualized to maintain virtual storage devices for the server. Virtual networks can be controlled by the server 712 using software defined networking. In various embodiments, the server 712 may be adapted to run one or more services or software applications described in the foregoing disclosure. For example, the server 712 may correspond to a server for performing processing as described above according to an embodiment of the present disclosure.

The server 712 may run an operating system including any of those discussed above, as well as any commercially available server operating system. Server 109 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 712 may include one or more applications to analyze and consolidate data feeds and/or event updates received from users of the client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 712 may also include one or more applications to display the data feeds and/or real-time events via one or more display devices of the client computing devices 702, 704, 706, and 708.

The distributed system 700 may also include one or more databases 714 and 716. These databases may provide a mechanism for storing information such as user authentication information, and other information used by embodiments of the present invention. Databases 714 and 716 may reside in a variety of locations. By way of example, one or more of databases 714 and 716 may reside on a non-transitory storage medium local to (and/or resident in) the server 712. Alternatively, the databases 714 and 716 may be remote from the server 712 and in communication with the server 712 via a network-based or dedicated connection. In one set of embodiments, the databases 714 and 716 may reside in a storage-area network (SAN). Similarly, any necessary files for performing the functions attributed to the server 712 may be stored locally on the server 712 and/or remotely, as appropriate. In one set of embodiments, the databases 714 and 716 may include relational databases, such as databases provided by Oracle, that are adapted to store, update, and retrieve data in response to SQL-formatted commands.

Figure 8:
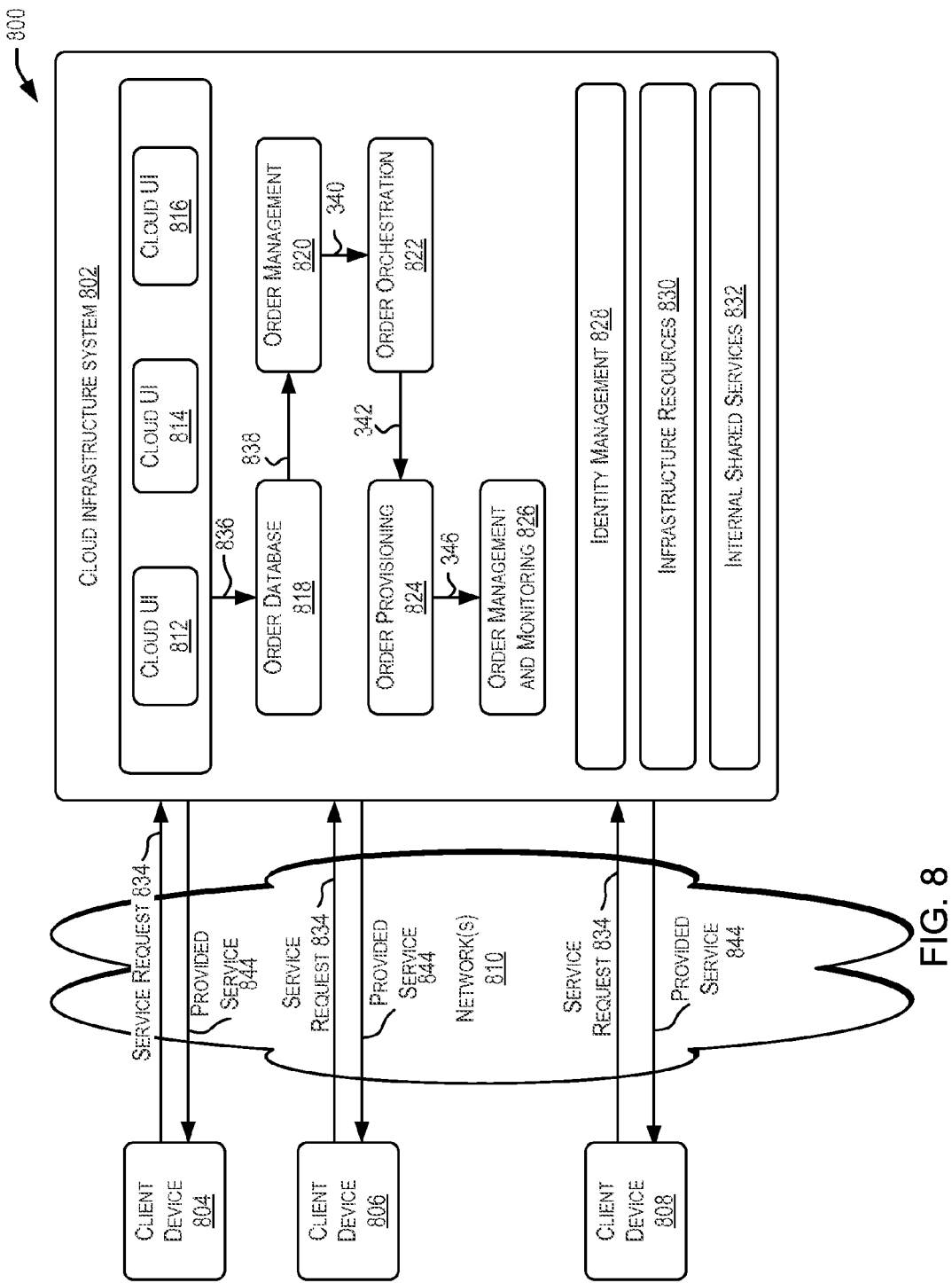
FIG. 8 is a simplified block diagram of one or more components of a system environment in which services may be offered as cloud services, in accordance with an embodiment of the present disclosure.

In some embodiments, the account management services described above may be offered as services via a cloud environment. FIG. 8 is a simplified block diagram of one or more components of a system environment 800 in which services may be offered as cloud services, in accordance with an embodiment of the present disclosure. In the illustrated embodiment in FIG. 8, system environment 800 includes one or more client computing devices 804, 806, and 808 that may be used by users to interact with a cloud infrastructure system 802 that provides cloud services, including services for dynamically modifying documents (e.g., webpages) responsive to usage patterns. Cloud infrastructure system 802 may comprise one or more computers and/or servers that may include those described above for server 712.

It should be appreciated that cloud infrastructure system 802 depicted in FIG. 8 may have other components than those depicted. Further, the embodiment shown in FIG. 8 is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 702, 704, 706, and 708. Client computing devices 804, 806, and 808 may be configured to operate a client application such as a web browser, a proprietary client application (e.g., Oracle Forms), or some other application, which may be used by a user of the client computing device to interact with cloud infrastructure system 802 to use services provided by cloud infrastructure system 802. Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 710.

In certain embodiments, services provided by cloud infrastructure system 802 may include a host of services that are made available to users of the cloud infrastructure system on demand. In addition to services related to account management, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 802 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 802 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle Corporation) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 802 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 802 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform, and other resources.

In some embodiments, resources in cloud infrastructure system 802 may be shared by multiple users and dynamically re-allocated per demand. Additionally, resources may be allocated to users in different time zones. For example, cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 to enable provision of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in FIG. 8, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In an exemplary operation, at 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI) such as cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

At 836, the order information received from the customer may be stored in an order database 818. If this is a new order, a new record may be created for the order. In one embodiment, order database 818 can be one of several databases operated by cloud infrastructure system 818 and operated in conjunction with other system elements.

At 838, the order information may be forwarded to an order management module 820 that may be configured to perform billing and accounting functions related to the order, such as verifying the order, and upon verification, booking the order.

At 840, information regarding the order may be communicated to an order orchestration module 822 that is configured to orchestrate the provisioning of services and resources for the order placed by the customer. In some instances, order orchestration module 822 may use the services of order provisioning module 824 for the provisioning. In certain embodiments, order orchestration module 822 enables the management of business processes associated with each order and applies business logic to determine whether an order should proceed to provisioning.

As shown in the embodiment depicted in FIG. 8, at 842, upon receiving an order for a new subscription, order orchestration module 822 sends a request to order provisioning module 824 to allocate resources and configure resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. This enables order orchestration module 824 to be isolated from implementation details, such as whether or not services and resources are actually provisioned on the fly or pre-provisioned and only allocated/assigned upon request.

At 844, once the services and resources are provisioned, a notification may be sent to the subscribing customers indicating that the requested service is now ready for use. In some instance, information (e.g. a link) may be sent to the customer that enables the customer to start using the requested services.

At 846, a customer's subscription order may be managed and tracked by an order management and monitoring module 826. In some instances, order management and monitoring module 826 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 800 may include an identity management module 828 that is configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 9:
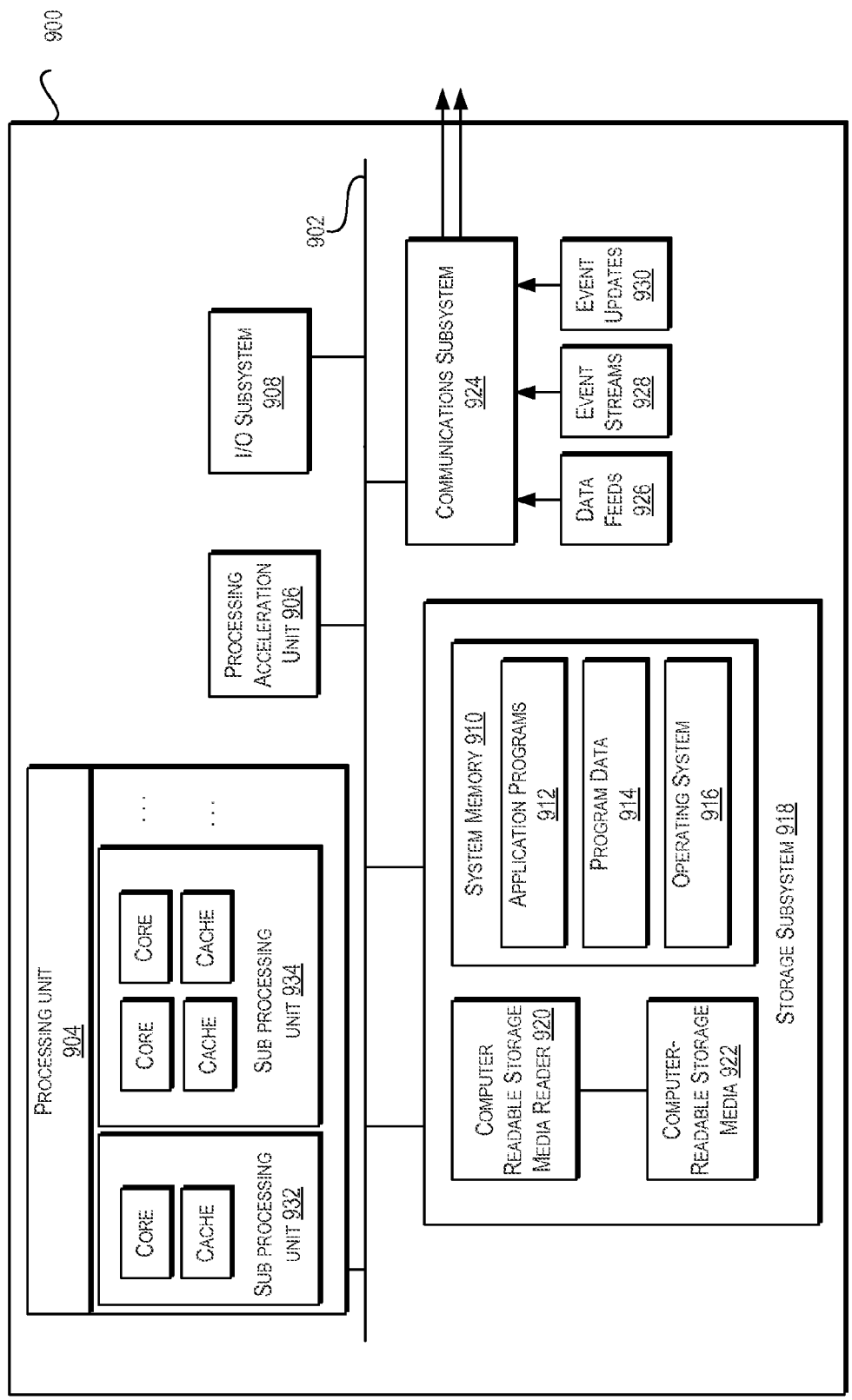
FIG. 9 illustrates an exemplary computer system that may be used to implement an embodiment of the present invention.

FIG. 9 illustrates an exemplary computer system 900 that may be used to implement an embodiment of the present invention. In some embodiments, computer system 900 may be used to implement any of the various servers and computer systems described above. As shown in FIG. 9, computer system 900 includes various subsystems including a processing subsystem 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 may include tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processing units 932, 934, etc. A processing unit may include be one or more processors, including single core or multicore processors, one or more cores of processors, or combinations thereof. In some embodiments, processing subsystem 904 can include one or more special purpose co-processors such as graphics processors, digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 910 including potentially on one or more storage devices. Through suitable programming, processing subsystem 904 can provide various functionalities described above for dynamically modifying documents (e.g., webpages) responsive to usage patterns.

In certain embodiments, a processing acceleration unit 906 may be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term "input device" is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass@). Additionally, user interface input devices may include voice recognition sensing devices that enable users to interact with voice recognition systems (e.g., Siri@navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information that is used by computer system 900. Storage subsystem 918 provides a tangible non-transitory computer-readable storage medium for storing the basic programming and data constructs that provide the functionality of some embodiments. Software (programs, code modules, instructions) that when executed by processing subsystem 904 provide the functionality described above may be stored in storage subsystem 918. The software may be executed by one or more processing units of processing subsystem 904. Storage subsystem 918 may also provide a repository for storing data used in accordance with the present invention.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM) or dynamic random access memory (DRAM).

By way of example, and not limitation, as depicted in FIG. 9, system memory 910 may store application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 922 may store programming and data constructs that provide the functionality of some embodiments. Software (programs, code modules, instructions) that when executed by processing subsystem 904 a processor provide the functionality described above may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 922 may provide storage of computer-readable instructions, data structures, program modules, and other data for computer system 900.

In certain embodiments, storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for storing computer-readable information.

In certain embodiments, computer system 900 may provide support for executing one or more virtual machines. Computer system 900 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 900. Accordingly, multiple operating systems may potentially be run concurrently by computer system 900. Each virtual machine generally runs independently of the other virtual machines.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices. For example, the account management system 112 depicted in FIG. 1 may receive user login information including input related to a training word from client devices using communication subsystem 924. Additionally, communication subsystem 924 may be used to communicate notifications of successful logins or notifications to re-enter a password from the account management system 112 to the requesting users.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, communications subsystem 924 may receive input communication in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A computer-implemented method comprising:
providing, by a computer system, a set of one or more training words to a user of a user computing device;
receiving, by the computer system, first input associated with a first training word from the set of one or more training words from the user, the first input comprising a first sequence of user input entries corresponding to the first training word;
receiving, from the user computing device, second input associated with one or more additional training words from the set of training words, the second input including a second sequence of user input entries related to the one or more additional training words;
deriving metadata associated with the first sequence of user input entries and the second sequence of user input entries;
generating a user input pattern profile based at least in part on the metadata;
receiving login information from the user computing device; and
determining whether the login information identifies the user based at least in part on the user input pattern profile.

2. The computer-implemented method of claim 1, wherein determining whether the login information identifies the user comprises comparing the received input to the user input pattern profile.

3. The computer-implemented method of claim 1, wherein deriving the metadata comprises deriving at least one of a dwell time related to the sequence of user input entries, a flight time related to the sequence of user input entries or latency related to the sequence of user input entries.

4. The computer-implemented method of claim 1, further comprising receiving a third input associated with an image of a string from the user computing device, wherein the image of the string is different from at least the training word and the one or more additional training words.

5. The computer-implemented method of claim 4, further comprising receiving a plurality of third user input entries related to the third input associated with the image of the string from the user computing device.

6. The computer-implemented method of claim 5, wherein identifying the user is further based at least in part on comparing the plurality of third user input entries related to the third input associated with the image of the string to a library of computer-generated entries not associated with the user.

7. One or more non-transitory computer-readable media storing computer-executable instructions executable by one or more processors, the computer-executable instructions comprising:
instructions that cause the one or more processors to receive first input associated with a first training word from a set of training words from a user computing device, the first input comprising a first sequence of user input entries corresponding to the first training word;
instructions that cause the one or more processors to receive, from the user computing device, second input associated with one or more additional training words from the set of training words, the second input including a second sequence of user input entries related to the one or more additional training words;
instructions that cause the one or more processors to derive metadata associated with the first sequence of user entries and the second sequence of user entries;
instructions that cause the one or more processors to generate one or more user input pattern profiles based at least in part on the metadata;
instructions that cause the one or more processors to receive login information from the user computing device;
instructions that cause the one or more processors to compare the received input to the one or more user input pattern profiles; and
instructions that cause the one or more processors to determine which of a first user or a second user provided the received input based at least in part on the comparison of the received input to the one or more user input pattern profiles.

8. The computer-readable media of claim 7, wherein the metadata comprises user input timing information related to at least one of the first sequence of user input entries or the second sequence of user input entries.

9. The computer-readable media of claim 8, wherein the user input timing information comprises at least one of a dwell time related to at least one of the first sequence of user input entries or the second sequence of user input entries, a flight time related to at least one of the first sequence of user input entries or the second sequence of user input entries or latency related to at least one of the first the sequence of user input entries or the second sequence of user input entries.

10. The computer-readable media of claim 7, wherein the one or more user input pattern profiles are generated based at least in part on determining a similarity between at least the first sequence of user input entries related to the first training word and the second sequence of user input entries related to the one or more additional training words.

11. The computer-readable media of claim 7, the instructions further comprising instructions that cause the one or more processors to determine a number of authorized users of a system based at least in part on the one or more generated user input pattern profiles.

12. The computer-readable media of claim 7, further comprising instructions that cause the one or more processors to provide a notification of service availability to at least one of the first user or the second user based at least in part on identifying which of the first user or the second user provided the received input.

13. A system comprising:
memory configured to store computer-executable instructions; and
at least one processor configured to access the memory and execute the computer-executable instructions to collectively at least:
identify a plurality of computer-generated entries associated with an image of a word;
receive login information from a user computing device;

generate a plurality of user input pattern profiles based at least in part on input associated with the login information;

compare the input associated with the login information with the plurality of computer-generated entries and the plurality of user input pattern profiles;

determine whether the login information identifies a user of the user computing device or a computer process associated with the plurality of computer-generated entries based at least in part on the comparison; and determine that an automated program is attempting access into the system based at least in part on comparing the input associated with the login information to the plurality of computer-generated entries and the plurality of user input pattern profiles.

14. The system of claim 13, wherein the input comprises a sequence of user input entries corresponding to the image of the word.

15. The system of claim 14, wherein the at least one processor is configured to execute the computer-executable instructions to generate the plurality of user input pattern profiles based at least in part on deriving metadata associated with the sequence of user input entries.

16. The system of claim 13, wherein the at least one processor is configured to execute the computer-executable instructions to identify a number of authorized users of the system based at least in part on the plurality of user input pattern profiles.

17. The system of claim 13, wherein the at least one processor is configured to execute the computer-executable instructions to provide a notification to the user computing device indicating availability of a service requested by the user of the user computing device based at least in part on determining that the login information identifies the user.

* * * * *